(12) United States Patent
Tang et al.

(10) Patent No.: US 8,705,443 B2
(45) Date of Patent: Apr. 22, 2014

(54) SYSTEM AND METHOD FOR REDUCED FEEDBACK IN MULTIUSER MULTIPLE INPUT, MULTIPLE OUTPUT WIRELESS COMMUNICATIONS

(75) Inventors: Yang Tang, San Diego, CA (US);
Pengfei Xia, San Diego, CA (US);
Zhigang Rong, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1094 days.

(21) Appl. No.: 12/711,654

(22) Filed: Feb. 24, 2010

(65) Prior Publication Data
US 2011/0205963 A1 Aug. 25, 2011

(51) Int. Cl.
*H04W 4/00* (2009.01)
*H04L 12/16* (2006.01)
*H04Q 11/00* (2006.01)
*H04L 27/00* (2006.01)

(52) U.S. Cl.
USPC ............ 370/328; 370/260; 370/329; 375/259

(58) Field of Classification Search
USPC ........................................................ 370/328
See application file for complete search history.

(56) References Cited

U.S. PATENT DOCUMENTS

| 2007/0280116 A1* | 12/2007 | Wang et al. | 370/236 |
| 2008/0225960 A1* | 9/2008 | Kotecha et al. | 375/259 |
| 2009/0067512 A1* | 3/2009 | Mielczarek et al. | 375/245 |

OTHER PUBLICATIONS

Jindal, N., "MIMO Broadcast Channels with Finite Rate Feedback," IEEE Transactions on Information Theory, pp. 1-18.
Love, D.J., et al., "What is the Value of Limited Feedback for MIMO Channels?," Adaptive Antennas and MIMO Systems for Wireless Communications, IEEE Communications Magazine, Oct. 2004, pp. 54-59.

\* cited by examiner

*Primary Examiner* — Noel Beharry
(74) *Attorney, Agent, or Firm* — Slater & Matsil, L.L.P.

(57) ABSTRACT

A system and method for reduced feedback in MU-MIMO communications is provided. A method for transmitter operations includes transmitting a pilot signal, receiving channel information feedback from a set of K communications devices served by a transmitter, where K is a non-negative integer value and $K \geq 2$, selecting M communications devices out of the set of K communications devices, where M is a non-negative integer value and $M \leq K$, computing a precoder for each of the M selected communications devices based on the channel information feedback, and simultaneously transmitting information to the M selected communications devices. The channel information feedback includes partial information for a communications channel between the transmitter and a communications device, the selecting being based on the channel information feedback, and the information transmitted to each communications device in the M selected communications devices being precoded using a computed precoder associated with the communications device.

14 Claims, 5 Drawing Sheets

SYSTEM AND METHOD FOR REDUCED FEEDBACK IN MULTIUSER MULTIPLE INPUT, MULTIPLE OUTPUT WIRELESS COMMUNICATIONS

TECHNICAL FIELD

The present invention relates generally to wireless communications, and more particularly, to a system and method for reduced feedback in multiuser multiple input, multiple output (MU-MIMO) wireless communications.

BACKGROUND

In order to achieve better channel utilization and increase overall performance, multiple transmission and multiple reception antennas (also commonly referred to as multiple input, multiple output (MIMO)) at both base stations (BSs) and mobile stations (MSs) are considered.

Closed loop multiuser multiple input, multiple output (MU-MIMO) technologies recently have attracted attention from both standardization bodies and the telecommunications industry around the world. By jointly taking advantage of multiuser diversity and an inherent space-time diversity of MIMO systems, MU-MIMO may significantly improve system throughput and achieve higher bandwidth efficiency compared to conventional single user MIMO.

The knowledge of channel state information (CSI) is an important factor in wireless communication systems, particularly MU-MIMO systems. Codebook based quantization is a known method for feeding back the channel state information, as taught by Love, et al. ("What is the Value of Limited Feedback for MIMO Channels?" *IEEE Communications Magazine*, Vol. 42 pp 54-59, October 2004). As is also known, the precision of channel state information plays a key role in achieving the desired gains of Multi-user MIMO systems, per Jindal, ("MIMO Broadcast Channels with Finite Rate Feedback," *IEEE Transactions on Information Theory*, Vol. 52, No. 11, pp. 5045-5059, November 2006).

In a MU-MIMO system, if multiple layers per mobile station (MS) are supported, the MU-MIMO precoding may rely on the feedback of channel coefficients, which may imply a very large feedback overhead.

SUMMARY

These and other problems are generally solved or circumvented, and technical advantages are generally achieved, by embodiments of a system and method for reduced feedback in multiuser multiple input, multiple output (MU-MIMO) wireless communications.

In accordance with an embodiment, a method for transmitter operations is provided. The method includes transmitting a pilot signal, receiving channel information feedback from a set of K communications devices served by a transmitter, where K is a non-negative integer value and K≥2, selecting M communications devices out of the set of K communications devices, where M is a non-negative integer value and M≤K, computing a precoder for each of the M selected communications devices based on the channel information feedback, and simultaneously transmitting information to the M selected communications devices. The channel information feedback from a communications device includes partial information for a communications channel between the transmitter and the communications device, and the selecting is based on the channel information feedback. The information transmitted to each communications device in the M selected communications devices is precoded using a computed precoder associated with the communications device.

In accordance with another embodiment, a method for receiver operations is provided. The method includes receiving a pilot signal, estimating a channel between a receiver and a transmitter serving the receiver, computing components of the channel estimate, transmitting the components of the channel estimate to the transmitter, and receiving a transmission from the transmitter. The transmission is precoded using a precoding vector determined based on the components of the channel estimate, and the transmission is part of a multi-user multiple input, multiple output transmission.

In accordance with another embodiment, a communications controller is provided. The communications controller includes a scheduler, a beamforming unit coupled to the scheduler, and a beamforming vector unit coupled to the beamforming unit. The scheduler selects M users for transmission in a transmission in a transmission opportunity, where M is a non-negative integer value greater than or equal to one. The selection is based on channel feedback information provided by the users, and the channel feedback information includes partial channel information. The beamforming unit maps information for the selected users onto beamforming vectors for transmission, and the beamforming vector unit computes a null space for each of the users selected by the scheduler and to compute beamforming vectors for each of the users based on the channel feedback information.

An advantage of an embodiment is that reduced feedback overhead is provided while not impacting system performance.

A further advantage of an embodiment is that the information fedback may be quantized to further reduce feedback overhead.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system supporting multiuser multiple input, multiple output (MU-MIMO) communications, such as WiMAX and Third Generation Partnership Project (3GPP) Long Term Evolution (LTE) and LTE-Advanced (LTE-A) compliant communications systems.

Figure 1A:
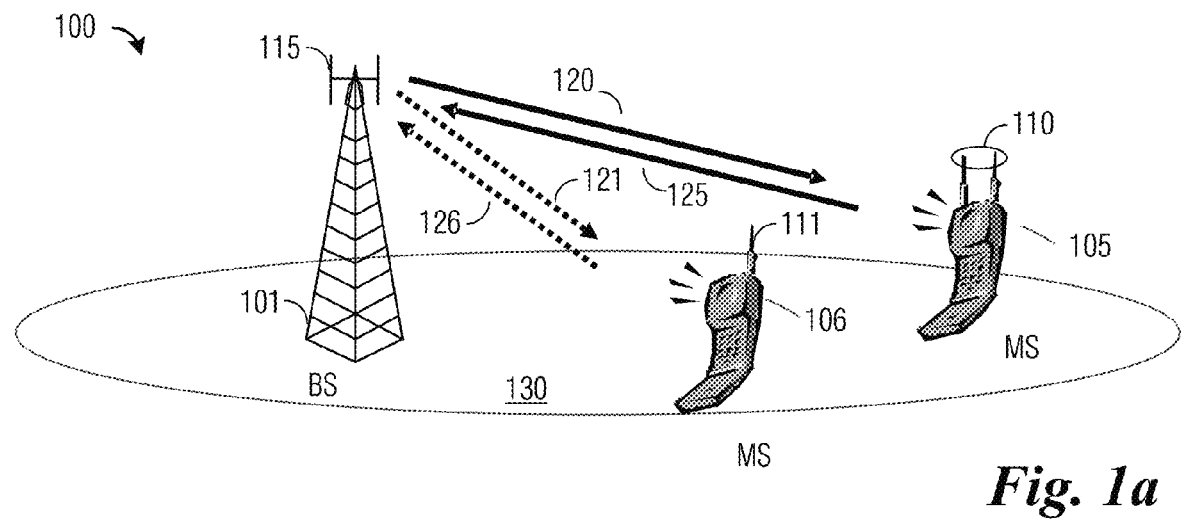
FIG. 1*a* is a diagram of a wireless communication system.

FIG. 1a illustrates a wireless communications system 100. Wireless communications system 100 includes a base station (BS) 101 and a plurality of mobile stations (MS), such as MS 105 and MS 106, which may be mobile or fixed. BS 101 and the MSs communicate using wireless communication. BSs may also be referred to as base transceiver stations, Node Bs, enhanced Node Bs, and so forth, while MSs may also be referred to as subscriber units, terminals, mobile devices, user equipment, users, and the like.

BS 101 has a plurality of transmit antennas 115 while the MSs have one or more receive antennas, for example, MS 105 may have antennas 110 and MS 106 may have antennas 111. BS 101 sends control information and data to the MSs through a downlink (DL) channel, DL channel 120 for MS 105 and DL channel 121 for MS 106, while the MSs send control information and data to BS 101 through an uplink (UL) channel, UL channel 125 for MS 105 and UL channel 126 for MS 106.

MS 105 may send control information (including channel state information (CSI)) on UL channel 125 to improve the quality of the transmission on DL channel 120, similarly, MS 106 may send control information on UL channel 126 to improve the quality of the transmission on DL channel 121. BS 101 may send control information on DL channels 120 and 121 for the purpose of improving the quality of UL channels 125 and 126, respectively. A cell 130 is a conventional term for the coverage area of BS 101. It is generally understood that in wireless communications system 100 there may be multiple cells corresponding to multiple BSs.

Figure 1B:
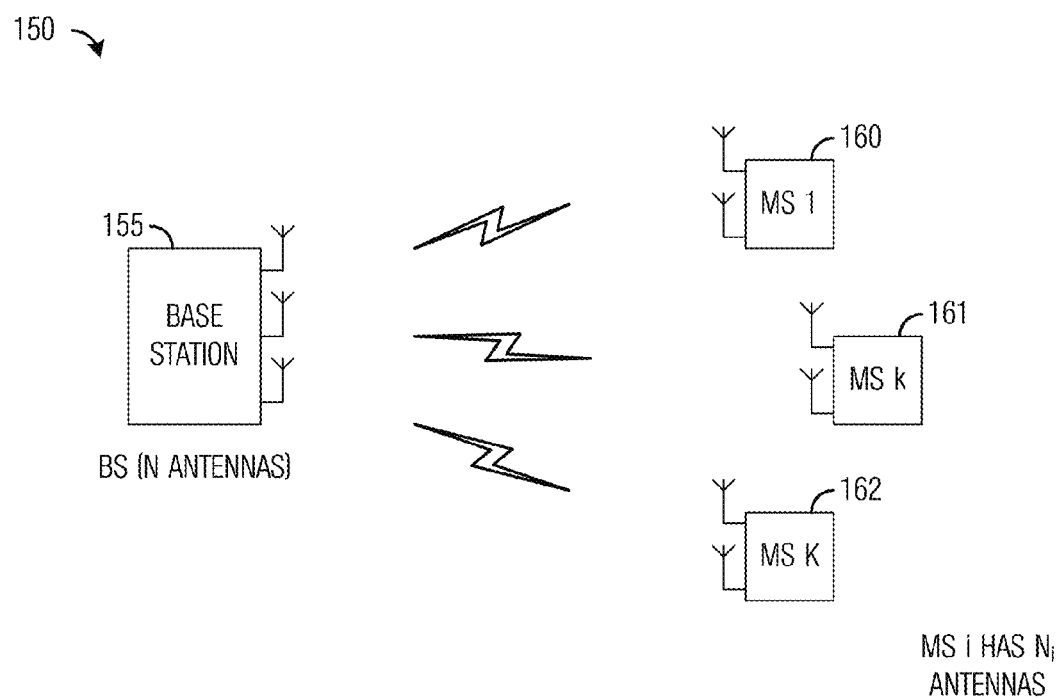
FIG. 1*b* is a diagram of a portion of a wireless communications system.

FIG. 1b illustrates a portion of a wireless communications system 150. Wireless communications system 150 includes a BS 155 and K MSs, such as MS 1 160, MS k 161, and MS K 162, where K is a non-negative integer value. As shown in FIG. 1b, BS 155 of wireless communications system 150 may have N transmit antennas, where N is a non-negative integer value and for MIMO operation, N is greater than or equal to two. Furthermore, an i-th MS may have N antennas, where N is a non-negative integer value.

BS 155 may use downlink MU-MIMO to improve overall performance of wireless communications system 150. In downlink MU-MIMO, BS 155 may select two or more of the K MSs to transmit to at any given time. For example, BS 155 may select L MSs out of the K MSs, where L is a non-negative integer value and L≤K, for transmission. The L MSs may simultaneously receive transmissions from BS 155. BS 155 may transmit a signal vector expressible as $$X = \sum_l X_l,$$

where $X_l$ is a signal intended for MS l. The transmissions made by BS 155 may be constrained by power constraint expressible as $$\sum_l Tr(Q_l) \le P,$$

where $Q_l$ is a covariance for MS l. A communications channel between MS l and BS 155 is defined as a matrix $H_l$, where $H_l$ is of size $N_l \times L$.

A received signal at MS l may be expressed as $$y_l = H_l X + n_l,$$

where $$X = \sum_l X_l$$

and $n_l$ is the noise at MS l. With a global downlink channel matrix expressible as $$H = \begin{bmatrix} H_1 \\ H_2 \\ \vdots \\ H_L \end{bmatrix},$$

a global receive vector for all MSs may be expressed as $$y = [y_1^T, \ldots, y_L^T]^T = H \sum_l X_l + n,$$

where $X_l$ is the signal vector to be transmitted to MS l.

Block diagonalized based MU-MIMO (BD MU-MIMO) is a suboptimal MU-MIMO solution that avoids inter-MS interference by using spatial division multiplexing (SDM) at a transmitter. Compared to zero forcing beamforming (ZFBF), BD MU-MIMO may be easily applied to a scenario where multiple streams (also commonly referred to as layers) are assigned to each scheduled MS. However, a conventional BD MU-MIMO algorithm may rely on full CSI, e.g., channel coefficients, which normally results in large feedback overhead. Furthermore, codebook based quantization of the channel coefficients may be very difficult if not impossible due to the large codebook necessary, thereby making the impact of the feedback of the channel coefficients on the overall communications system performance even greater.

Figure 2A:
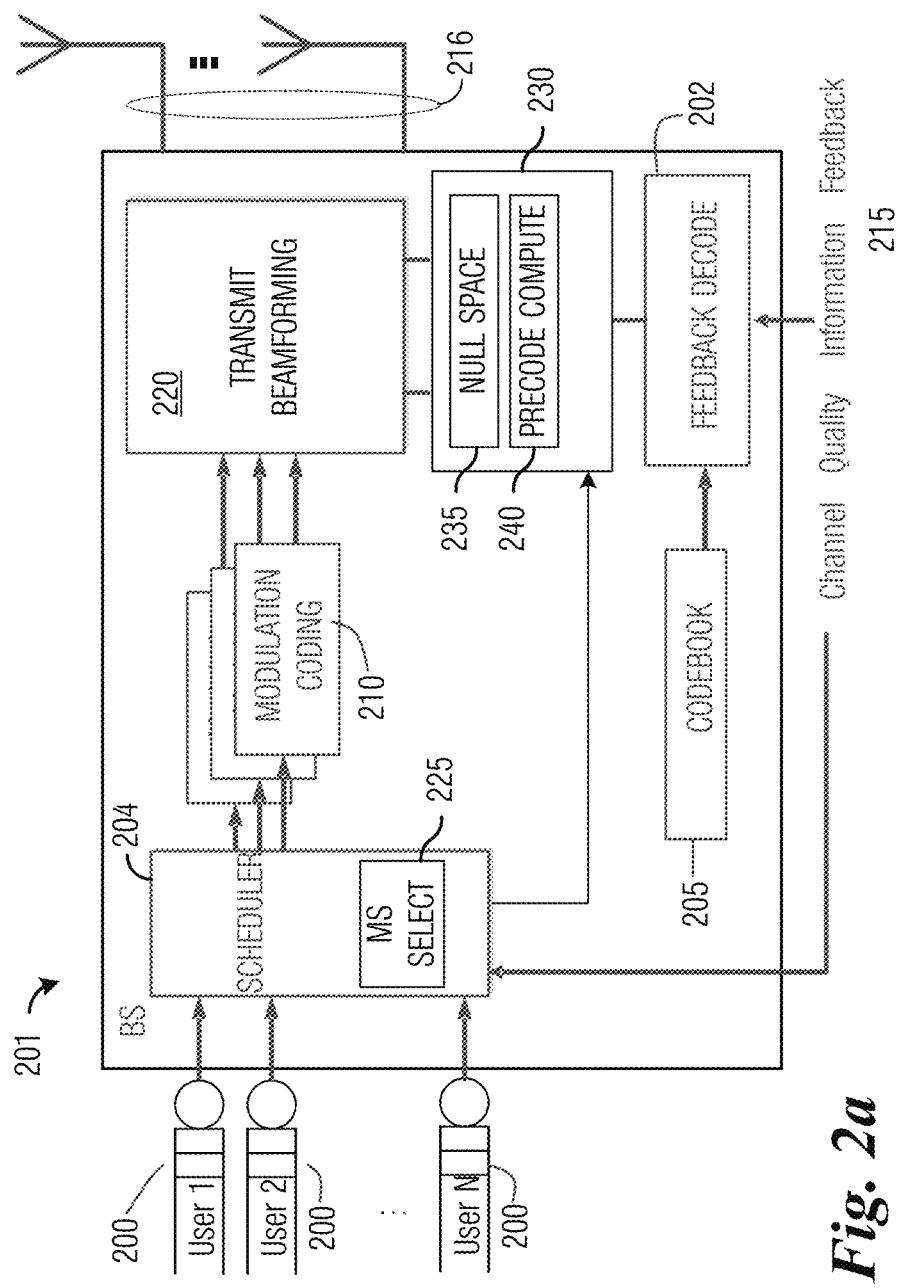
FIG. 2*a* is a diagram of a BS.

FIG. 2a illustrates a BS 201. Data 200, in the form of bits, symbols, or packets for example, destined for a plurality of MSs being served are sent to a scheduler 204, which decides which MSs will be transmitted to in a given time/frequency opportunity. For MU-MIMO, scheduler 204 may select L out of K MSs for transmission at a given time. The selection of the L MSs may be based on factors such as maximizing throughput, service history, MS priority, information priority, and so forth. The selection of the MSs may be performed in a MS select unit 225 in scheduler 204.

Data for MSs are processed by modulation and coding block 210 to convert to transmitted symbols and add redundancy for the purpose of assisting with error correction or error detection. The modulation and coding scheme is chosen based in part on information about the channel quality information feedback 215.

The output of modulation and coding block 210 is passed to a transmit beamforming block 220, which maps the modulated and coded stream for each MS onto a beamforming vector. The beamformed outputs are coupled to antennas 216 through RF circuitry. The transmit beamforming vectors may be input from a beamforming vector unit 230, which may determine the transmit beamforming vectors based on channel quality information feedback 215 as well as information from scheduler 204, which may include information regarding the L MSs selected for transmission, and so on.

Beamforming vector unit 230 may include a null space unit 235 and a precode compute unit 240. For each of the L MSs selected by scheduler 204, null space unit 235 may be used to compute a joint null space for the remaining L−1 MSs due to the selected MS. The joint null space for a MS may be defined as a space wherein there is no interference to the L−1 MSs due to the MS. For example, let MS i be one of the L MSs selected by scheduler 204, then null space unit 235 may compute a joint null space for the L−1 MSs due to MS i. Precode compute unit 240 may be used to compute a precoder (beamforming vectors) for each of the L MSs. The precoders may be selected to maximize a signal to noise ratio (SNR) for each of the L MSs. Precode compute unit 240 may utilize eigen components related to the channel coefficients (i.e., CSI) rather than the channel coefficients themselves to help reduce feedback overhead. A detailed description of the operation of null space unit 235 and precode compute unit 240 is provided below.

Feedback decode unit 202 decodes feedback information from channel quality information feedback 215. Decoding feedback information may involve the use of a codebook 205 if channel quality information feedback 215 was quantized using a codebook by a MS. Additionally, channel quality information feedback 215 may be encoded to protect from transmissions. If so protected, feedback decode unit 202 may remove the encoding used to protect channel quality information feedback 215 to produce feedback information. Output of feedback decode unit 202 (e.g., eigen components of the channel coefficients) may be provided to beamforming vector unit 230. Channel quality information feedback 215 may also be provided to scheduler 204, which may use the information in its scheduling of MSs.

Scheduler 204 may use any of the known scheduling disciplines in the literature including round robin, maximum sum rate, proportional fair, minimum remaining processing time, or maximum weighted sum rate; generally scheduling decisions are based on channel quality information feedback 215 received from the plurality of MSs. Scheduler 204 may decide to send information to a single MS via transmit beamforming or may decide to serve multiple MSs simultaneously through MU-MIMO communications.

Modulation and coding block 210 may perform any number of coding and modulation techniques including quadrature amplitude modulation, phase shift keying, frequency shift keying, differential phase modulation, convolutional coding, turbo coding, bit interleaved convolutional coding, low density parity check coding, fountain coding, or block coding. The choice of modulation and coding rate in a preferred embodiment may be made based on channel quality information feedback 215 in a preferred embodiment and may be determined jointly in scheduler 204.

While not explicitly illustrated, it is obvious to those of ordinary skill in the art that OFDM modulation can be used. Further, any number of multiple access techniques could be used including orthogonal frequency division multiple access, code division multiple access, frequency division multiple access, or time division multiple access. The multiple access technique may be combined with the modulation and coding block 210 or the transmit beamforming block 220 among others.

Channel quality information feedback 215 may, for purposes of illustration, be in the form of quantized channel measurements, modulation, coding, and/or spatial formatting decisions, received signal strength, and signal-to-interference-plus-noise measurements.

Figure 2B:
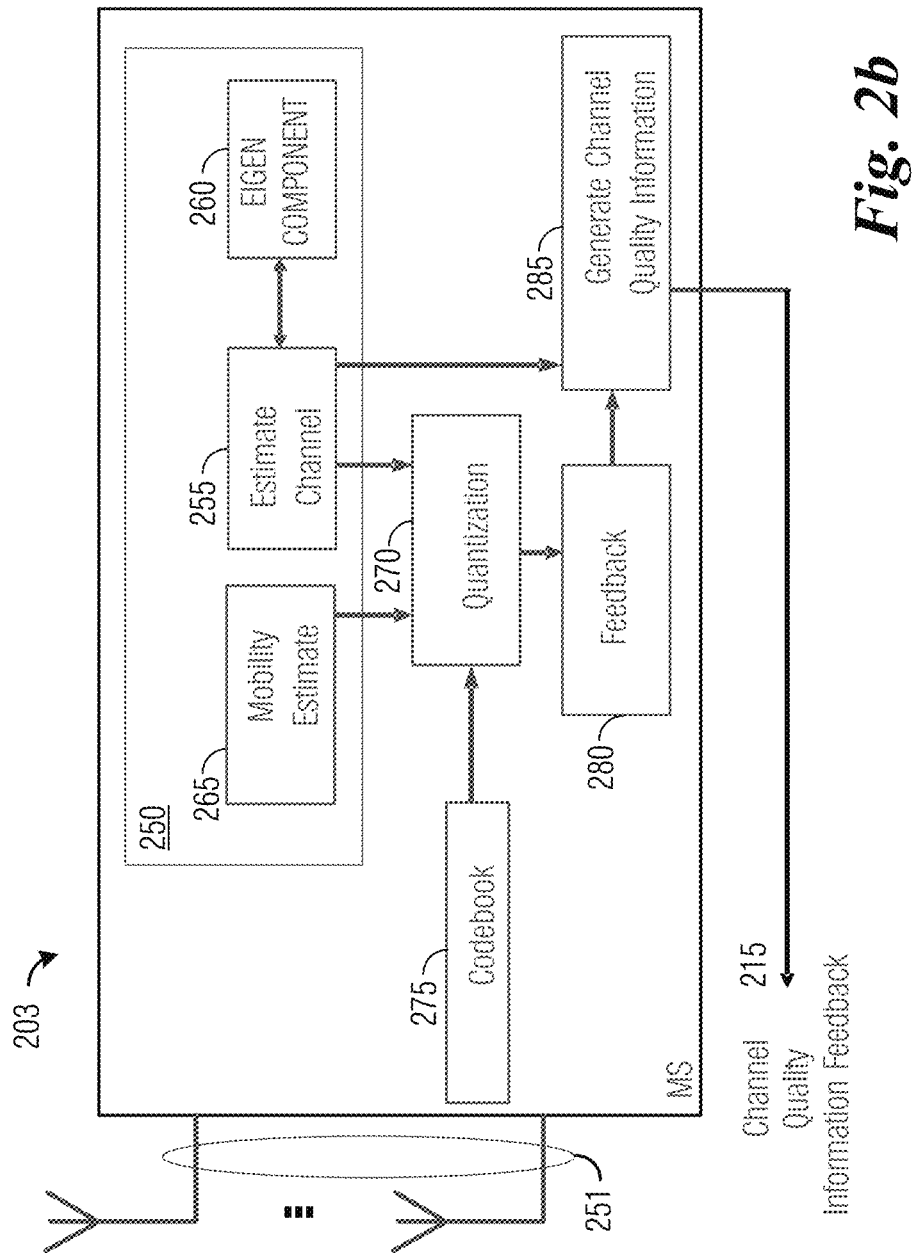
FIG. 2*b* is a diagram of a MS.

FIG. 2b illustrates MS 203. MS 203 may have one or more receive antennas 251, connecting through RF circuitry to a receiver signal processing block 250. Some of the key components of receiver signal processing block 250 include channel estimation block 255, eigen component block 260, and a mobility estimate block 265.

Channel estimation block 255 may employ any number of algorithms known in the art including least squares, maximum likelihood, maximum a postiori, Bayes estimator, adaptive estimator, a blind estimator, or so forth, to estimate a channel between MS 203 and its serving BS. Some algorithms exploit known information inserted into the transmit signal in the form of training signals, training pilots, while others use structure in the transmitted signal such as cyclostationarity to estimate coefficients of the channel between the BS and the MS.

Eigen component block 260 may be used to compute eigen components of the channel between MS 203 and its serving BS. According to an embodiment, eigen component block 260 may make use of singular value decomposition (SVD) to compute the eigen components from a channel estimate provided by channel estimation block 255, which may then be fedback to the BS serving MS 203. It may be also possible to further reduce the amount of information fedback to the BS by quantizing the eigen components using quantization block 270 using codebook 275.

Channel state information produced from information provided by channel estimation block 255 is quantized using a quantization block 270. Quantization block 270 quantizes the channel state information using a codebook 275. An index from codebook 275 may be output from quantization block 270. An estimate of the amount of channel variation, produced by mobility estimate block 265, may be used to improve the quantization algorithm by initializing the algorithm from a previous quantization level or adjusting the amount of localization.

Feedback block 280 generates a new feedback message by combining the codebook indices output from quantization block 270. Generate channel quality information block 285 generates a special feedback control message employing the outputs of feedback block 280 to produce channel quality information feedback 215. Generate channel quality information block 285 may also apply an error correcting code to protect information in the feedback message from errors.

Figure 3:
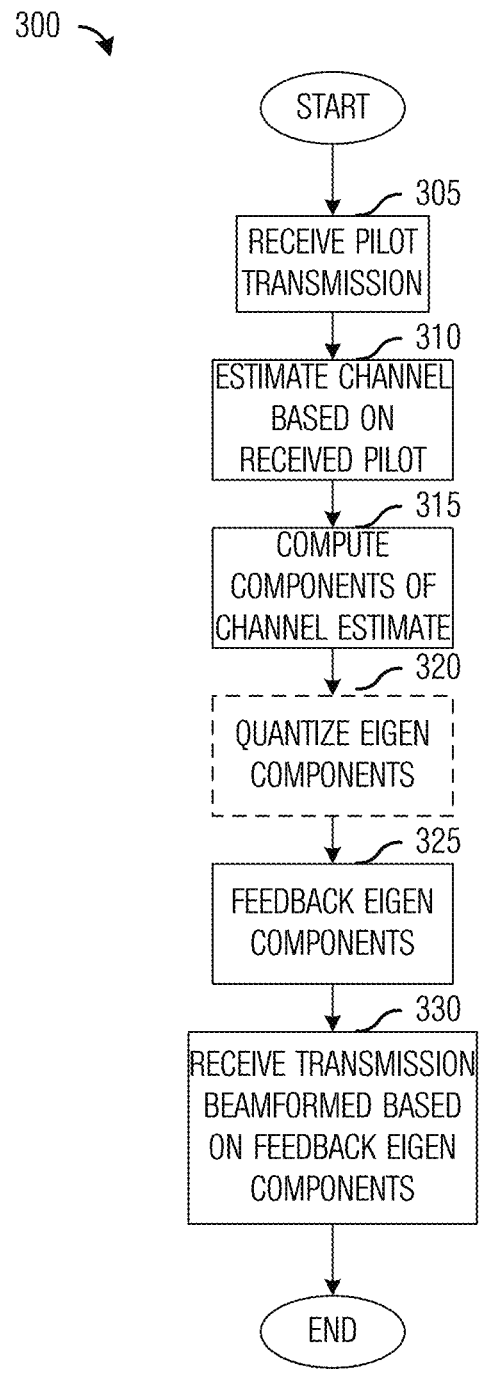
FIG. 3 is a flow diagram of MS operations in providing feedback information to a BS in MU-MIMO communications.

FIG. 3 illustrates a flow diagram of MS operations 300 in providing feedback information to a BS in MU-MIMO communications. MS operations 300 may be indicative of operations occurring in a MS, such as MS 203, as the MS and a BS, such as BS 201, participate in MU-MIMO communications. MS operations 300 may occur while the MS is in a normal operating mode and while the MS and the BS continue to communicate using MU-MIMO.

MS operations 300 may begin with the MS receiving a transmitted pilot from the BS (block 305). In general, the pilot may be a special sequence transmitted by the BS intended for use by MSs in measuring a communications channel between the BS and the MS, i.e., the downlink channel. In an alternative embodiment, instead of the pilot, the BS may transmit a reference sequence.

The MS may then estimate the downlink channel between the BS and the MS using the received pilot (block 310). The MS may use any of a variety of techniques to measure the downlink channel using the pilot. In an alternative embodiment, instead of estimating the downlink channel using the received pilot, the MS may make use of the received reference signal. In yet another alternative embodiment, the BS may not transmit a pilot or a reference signal. Instead, the MS may use regular transmissions made by the BS overtime to estimate the downlink channel.

From the estimate of the downlink channel, the MS may compute eigen components of the estimate for use in feeding back channel state information (block 315). Since channel coefficients from the estimate of the downlink channel may be used by the BS to select and schedule MSs for MU-MIMO communications, it may be desirable to feedback the channel coefficients to the BS. However, feeding back the channel coefficients may result in a very high feedback overhead. The very high feedback overhead may be due to the large number of channel coefficients that must be fedback, as well as the nature of the channel coefficients that may prohibit the use of feedback reduction techniques, such as codebook quantization.

For discussion purposes, assume that a total number of transmit antennas at the BS is $N_T$ and that there are K MSs with a k-th MS having $N_{Rk}$ receive antennas. The downlink channel between the BS and the k-th MS may be denoted by a $N_{Rk} \times N_T$ matrix $H_k$. According to an embodiment, the MS may use SVD to redefine $H_k$. With SVD, $H_k$ may be defined as $$H_k = U_k D_k V_k^H,$$

where $U_k$ is a matrix of eigenvectors for the downlink channel, $D_k$ is a matrix of non-zero eigenvalues for the downlink channel, and $V_k$ is a $N_T \times N_T$ unitary matrix given as $$V_k = [v_{k1}, \ldots, v_{kN_T}] = [V_{k1}, V_{k0}],$$

in which $V_{k1}$ and $V_{k0}$ represent a signaling space and a null space of the k-th MS, respectively.

After computing the eigen components of the estimate, the MS may optionally quantize the eigen components using a codebook common to both the MS and the BS (block 320). Quantizing the eigen components may be possible since $V_k$ is a unitary matrix and may further help to reduce the feedback overhead. The MS may then feedback the eigen components (quantized or unquantized) to the BS (block 325). According to an embodiment, the MS may feedback to the BS the eigenvalues (e.g., matrix $D_k$) as well as the signaling space (e.g., matrix $V_{k1}$). The eigen components, either quantized or unquantized, may be fedback to the BS using a feedback channel.

The MS may subsequently receive a transmission from the BS, wherein the transmission may be beamformed using beamforming vectors computed by the BS using the eigen components fedback by the MS (block 330). MS operations 300 may then terminate.

Figure 4:
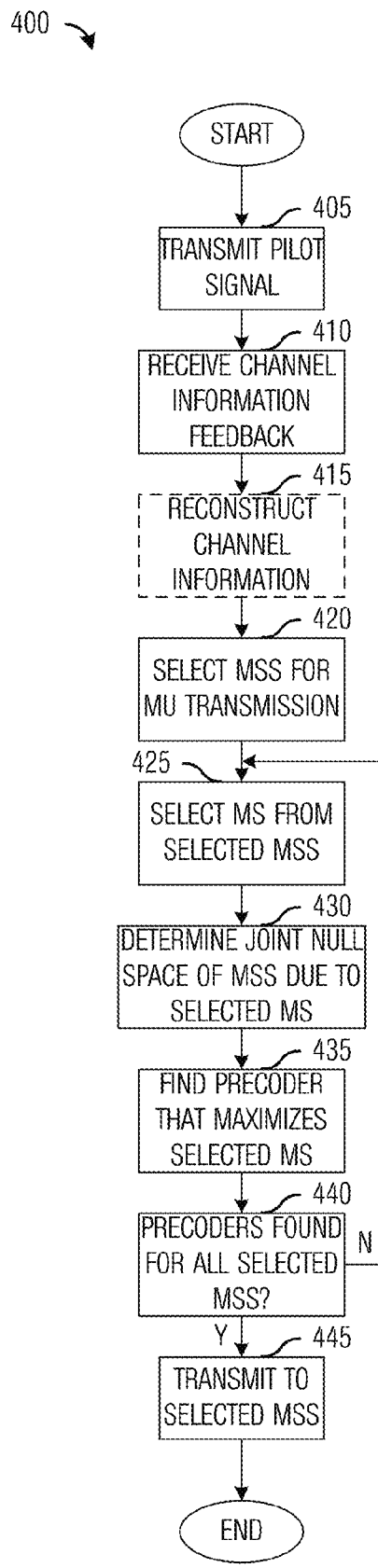
FIG. 4 is a flow diagram of BS operations in performing MU-MIMO communications with MSs operating in its service area.

FIG. 4 illustrates a flow diagram of BS operations 400 in performing MU-MIMO communications with MSs operating in its service area. BS operations 400 may be indicative of operations occurring in a BS, such as BS 201, as the BS and MSs operating within its coverage area, such as MS 203 among others, participate in MU-MIMO communications. BS operations 400 may occur while the BS is in a normal operating mode and while the BS and the MSs continue to communicate using MU-MIMO.

BS operations 400 may begin with the BS transmitting a pilot signal (block 405). Usually, the pilot signal may be a special sequence transmitted by the BS intended for use by the MSs operating within its coverage area to measure a downlink channel between the BS and each of the respective MSs. The measurement of the downlink channel may then be used to compute an estimate of the downlink channel and then determine channel state information feedback. According to an alternative embodiment, instead of transmitting the pilot, the BS may transmit a reference signal. According to another alternative embodiment, the BS does not transmit a special signal or sequence. Instead, normal transmissions by the BS may be used by the respective MSs to measure the downlink channel.

After transmitting the pilot, the BS may receive channel information feedback from the MSs operating within its coverage area (block 410). The BS may receive eigen components of matrices corresponding to the estimates of the downlink channel between the BS and the respective MSs. According to an embodiment, for each MS providing channel information feedback, the BS may receive the eigenvalues (e.g., matrix $D_k$) as well as the signaling space (e.g., matrix $V_{k1}$) of the channel estimate. According to an embodiment, not every MS operating in the coverage area of the BS may report channel information feedback. Furthermore, the eigen components may either be quantized or unquantized. If quantized, the quantization may be performed using a codebook common to both the BS and the MSs. If the eigen components are received in quantized form, the BS may then reconstruct the eigen components using the codebook (block 415).

Based on the channel information fedback by the MSs, the BS may then select M MSs for MU-MIMO transmission out of K total MSs providing channel information feedback, where M and K are non-negative integer values and M is less than or equal to K (block 420). Generally, the BS may select two or more MSs to schedule simultaneous transmissions; the selection being based on criteria such as fairness, priority, history, channel quality, available bandwidth, amount of information to transmit, and so forth. From the M MSs selected for MU-MIMO transmission, the BS may select one MS (block 425). According to an embodiment, the BS may select any of the M MSs selected for MU-MIMO transmission in no particular order. For example, the BS may simply select a MS based on an ascending or descending MS identifier or some other unique identifier assigned to the MS.

For the selected MS, the BS may determine a joint null space for all of the remaining M−1 MSs selected for MU-MIMO transmission with respect to the selected MS (block 430). A joint null space may be defined as a space wherein a transmission made in the joint null space by the selected MS causes no interference to other M−1 MSs. When the BS has selected M MSs out of K MSs operating in the coverage area of the BS, there may be $C_K^M$ different MS combinations. Without loss of generality, for an i-th combination (where i is a non-negative integer value), an aggregation of feedback signaling spaces of M MSs may be denoted $$V_i = [V_{11}, \ldots, V_{M1}], i \in \{1, \ldots, C_K^M\},$$

where $V_{j1}$ is the signaling space for a j-th MS as reported to the BS in channel information feedback provided by MS j.

For discussion purposes and without loss of generality, let the BS select MS 1 as the selected MS, then the joint null space for all of the remaining M−1 MSs, i.e., MS 2 through MS M, may be found using SVD and may be expressible as $$[V_{21}, \ldots, V_{M1}]^H = \hat{U}_{i1}\hat{D}_{i1}\hat{V}_{i1}^H,$$

where $\hat{U}_{i1}$ is a matrix of eigenvectors for the aggregation of feedback signaling spaces, $\hat{D}_{i1}$ is a matrix of non-zero eigenvalues for the aggregation of feedback signaling spaces, $\hat{V}_{i1} = [\hat{V}_{i11}, \hat{V}_{i10}]$, and $\hat{V}_{i10}$ is a null space of $[V_{21}, \ldots, V_{M1}]$ and is also the shared null space of MS 2 through MS M.

With the joint null space for the M−1 MSs other than the selected MS (e.g., MS 1), the BS may then find a precoder (i.e., a beamforming vector) for the selected MS, e.g., MS 1 (block 435). According to an embodiment, the BS attempts to find a precoder that maximizes transmissions to the selected MS. The precoder of the selected MS may be denoted $$\hat{V}_{i10}P_{i1},$$

where $P_{i1}$ is a power allocation matrix and may be expressible as $$P_{i1} = \arg\{\max(\log_2 \det(I + SNR_1(D_1 V_{11}^H \hat{V}_{i10} P_{i1})^2))\}.$$

Using SVD, matrix $D_1 V_{11}^H \hat{V}_{i10}$ may be rewritten as $$D_1 V_{11}^H \hat{V}_{i10} = U_{i1H} D_{i1H} V_{i1H}^H.$$

If $D_1$ is not available at the BS, SVD may only be applied to $V_{11}^H \hat{V}_{i10}$. Therefore, it may be defined that $$V_{11}^H \hat{V}_{i10} = U_{i1H} D_{i1H} V_{i1H}^H.$$

Consequently, $P_{i1}$ may be given by $$P_{i1} = V_{i1H}(:,1:N) \times Q,$$

hence $P_{i1}$ may be the first N columns of $V_{i1H}$, which is the joint null space of $D_1 V_{11}^H \hat{V}_{i10}$ or $V_{11}^H \hat{V}_{i10}$ if $D_1$ is not available, where Q is a power allocation diagonal matrix and $N \le N_R$ may be determined by various design criteria.

A total throughput of the i-th combination is expressible as $$C_i = \sum_{j=1}^{M} \log_2 \det\left(I + SNR_1\left(D_1 V_{11}^H \hat{V}_{i10} V_{i1H}(:,1:N)Q\right)^2\right),$$

where $SNR_1$ is the signal to noise ratio at MS 1. Therefore, a total output of the i-th MS combination may also be determined by maximizing $C_i$, $i \in \{1, \ldots, C_K^M\}$.

With the joint null space for all MSs selected for MU-MIMO with respect to the selected MS, e.g., MS 1, and the precoder for MS 1 determined, the BS may perform a check to determine if joint null spaces and precoders have been determined for remaining M−1 MSs selected for MU-MIMO communications (block 440). If joint null spaces and precoders have been determined for remaining M−1 MSs selected for MU-MIMO communications, then BS may then transmit to the M MSs using the precoders for the M MSs (block 445) and BS operations 400 may then terminate. If joint null spaces and precoders have not been determined for remaining M−1 MSs selected for MU-MIMO communications, then the BS may return to block 425 to select another MS from the M MSs selected for MU-MIMO communications and BS operations 400 may continue.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for transmitter operations, the method comprising:
    transmitting a pilot signal;
    receiving channel information feedback from a set of K communications devices served by a transmitter, where K is a non-negative integer value and K≥2, wherein the channel information feedback from a communications device comprises partial information for a communications channel between the transmitter and the communications device;
    selecting M communications devices out of the set of K communications devices in accordance with the channel information feedback, where M is a non-negative integer value and M≥K;
    computing a precoder for each of the M selected communications devices in accordance with the channel information feedback, wherein computing a precoder for each of the M selected communications devices comprises selecting one of the M selected communications devices and computing a precoder for the selected communications device by maximizing $\hat{V}_{i10}P_{i1}$, where $\hat{V}_{i10}$ is a joint null space of $[V_{21}, \ldots, V_{M1}]$, and $P_{i1}$ is a power allocation matrix; and
    simultaneously transmitting information to the M selected communications devices, wherein the information transmitted to each communications device in the M selected communications devices is precoded using a computed precoder associated with the communications device.

2. The method of claim 1, further comprising reconstructing the channel information feedback using a codebook.

3. The method of claim 1, wherein the channel information feedback from the communications device comprises a signaling space for the communications device.

4. The method of claim 3, wherein the channel information feedback further comprises a null space for the communications device.

5. The method of claim 1, wherein computing a precoder for each of the M selected communications devices further comprises:
    computing a joint null space for a remaining M−1 selected communications devices of the M selected communications devices with respect to the first communications device; and
    repeating the selecting one of the M selected communications devices, the computing a joint null space, and the computing a precoder for the selected communications devices for each of the M−1 selected communications devices.

6. The method of claim 5, wherein computing a joint null space comprises computing $$[V_{21}, \ldots, V_{M1}]^H = \hat{U}_{i1}\hat{D}_{i1}\hat{V}_{i1}^H,$$

where $\hat{U}_{i1}$ is a matrix of eigenvectors for aggregation of feedback signaling spaces, $\hat{D}_{i1}$ is a matrix of non-zero eigenvalues for the aggregation of feedback signaling spaces, $V_i=[V_{11}, \ldots, V_{M1}]$, $i \in \{1, \ldots, C_K^M\}$ is an aggregation of signaling spaces of the M selected communications devices fedback by the M selected communications devices, $V_{11}$ is a feedback signaling space for the selected communications device, $\hat{V}_{i1}=[\hat{V}_{i11}, \hat{V}_{i10}]$, and $\hat{V}_{i10}$ is a null space of $[V_{21}, \ldots, V_{M1}]$.

7. The method of claim 6, wherein $[V_{21}, \ldots, V_{M1}]^H = \hat{U}_{i1}\hat{D}_{i1}\hat{V}_{i1}^H$ is computed using singular value decomposition.

8. The method of claim 1, wherein $P_{i1}$ is expressible as $$P_{i1}=\arg\{\max(\log_2\det(I+SNR_1(D_1V_{11}^H\hat{V}_{i10}P_{i1})^2))\}.$$

9. The method of claim 8, wherein the channel information feedback further comprises a matrix of non-zero eigenvalues ($D_1$) for a downlink channel extending between the transmitter and the selected communications device, wherein matrix $D_1V_{11}^H\hat{V}_{i10}$ is expressible as $$D_1V_{11}^H\hat{V}_{i10}=U_{i1II}D_{i1II}V_{i1II}^H$$

using singular value decomposition, and wherein $P_{i1}$ is expressible as $$P_{i1}=V_{i1II}(:,1:N)\times Q,$$

with notation $V_{i1II}(:,1:N)$ representing selecting a first N columns of $V_{i1II}$, where $V_{i1II}$ is the joint null space of $D_1V_{11}^H\hat{V}_{i10}$, Q is a power allocation diagonal matrix and $N \leq N_R$, and $N_R$ is a number of receive antennas at the selected communications device.

10. The method of claim 8, wherein matrix $V_{11}^H\hat{V}_{i10}$ expressible as $$V_{11}^H\hat{V}_{i10}=U_{i1II}D_{i1II}V_{i1II}^H$$

using singular value decomposition, and wherein $P_{i1}$ is expressible as $$P_{i1}=V_{i1II}(:,1:N)\times Q$$

with notation $V_{i1II}(:,1:N)$ representing selecting a first N columns of $V_{i1II}$, where $V_{i1II}$ is the joint null space of $V_{11}^H\hat{V}_{i10}$, Q is a power allocation diagonal matrix and $N \leq N_R$, and $N_R$ is a number of receive antennas at the selected communications device.

11. A communications controller comprising:
a scheduler comprising a processor coupled to a memory, the processor being configured to select M users for transmission in a transmission opportunity in accordance with channel feedback information provided by users, where M is a non-negative integer value greater than or equal to one, and wherein the channel feedback information comprises partial channel information;
a beamforming unit coupled to the scheduler, the beamforming unit configured to map information for the selected users onto beamforming vectors for transmission; and
a beamforming vector unit coupled to the beamforming unit, the beamforming vector unit configured to compute a null space for each of the users selected by the scheduler and to compute beamforming vectors for each of the users based on the channel feedback information, wherein the beamforming vector unit comprises a precoding compute unit configured to compute a precoder for a selected user by maximizing $\hat{V}_{i10}P_{i1}$, where $\hat{V}_{i10}$ is a joint null space of $[V_{21}, \ldots, V_{M1}]$, and $P_{i1}$ is a power allocation matrix.

12. The communications controller of claim 11, wherein the beamforming vector unit further comprises:
a null space unit configured, for each of the M users, to select a user and to compute a joint null space for each of remaining M−1 users with respect to the selected user.

13. The communications controller of claim 11, wherein the scheduler further comprises a user select unit configured to select the M users based on maximizing throughput, service history, user priority, information priority, or combinations thereof.

14. The communications controller of claim 11, wherein $P_{i1}$ is expressible as $$P_{i1}=\arg\{\max(\log_2\det(I+SNR_1(D_1V_{11}^H\hat{V}_{i10}P_{i1})^2))\}.$$

* * * * *

UNITED STATES PATENT AND TRADEMARK OFFICE
CERTIFICATE OF CORRECTION

PATENT NO. : 8,705,443 B2  
APPLICATION NO. : 12/711654  
DATED : April 22, 2014  
INVENTOR(S) : Yang Tang Page 1 of 1

It is certified that error appears in the above-identified patent and that said Letters Patent is hereby corrected as shown below:

In the Claims

In Col. 10, line 28, claim 1, delete "$M \geq K;$" and insert --$M \leq K;$--.

In Col. 11, line 37, claim 10, insert a --,-- after "$P_{i1} = V_{i1II}(:,1:N) \times Q$".

Signed and Sealed this  
Twenty-ninth Day of July, 2014

Michelle K. Lee  
*Deputy Director of the United States Patent and Trademark Office*